(No Model.)

J. L. KOSTER.
HEATER FOR BARRELS.

No. 336,239.   Patented Feb. 16, 1886.

Witnesses:
Geo. H. Strong.
J. H. Towne

Inventor,
John L. Koster
By Dewey & Co.
Attorneys

UNITED STATES PATENT OFFICE.

JOHN L. KOSTER, OF SAN FRANCISCO, CALIFORNIA.

HEATER FOR BARRELS.

SPECIFICATION forming part of Letters Patent No. 336,239, dated February 16, 1886.

Application filed June 1, 1885. Serial No. 167,303. (No model.)

*To all whom it may concern:*

Be it known that I, JOHN L. KOSTER, of the city and county of San Francisco, State of California, have invented an Improvement in Heaters for Barrels; and I hereby declare the following to be a full, clear, and exact description of the same.

My invention relates to that class of stoves or heating devices which are used for heating barrels; and my invention consists in the construction of the smoke-flue within the cylinder of the heater, and in a surrounding casing extending but part of the height of the cylinder.

The object of my invention is to make as simple a heater as possible by incorporating the smoke-flue in its body, and, also, by means of the encircling casing, to equalize the heat and distribute it more evenly over the barrel, as I shall hereinafter explain.

Figure 1:
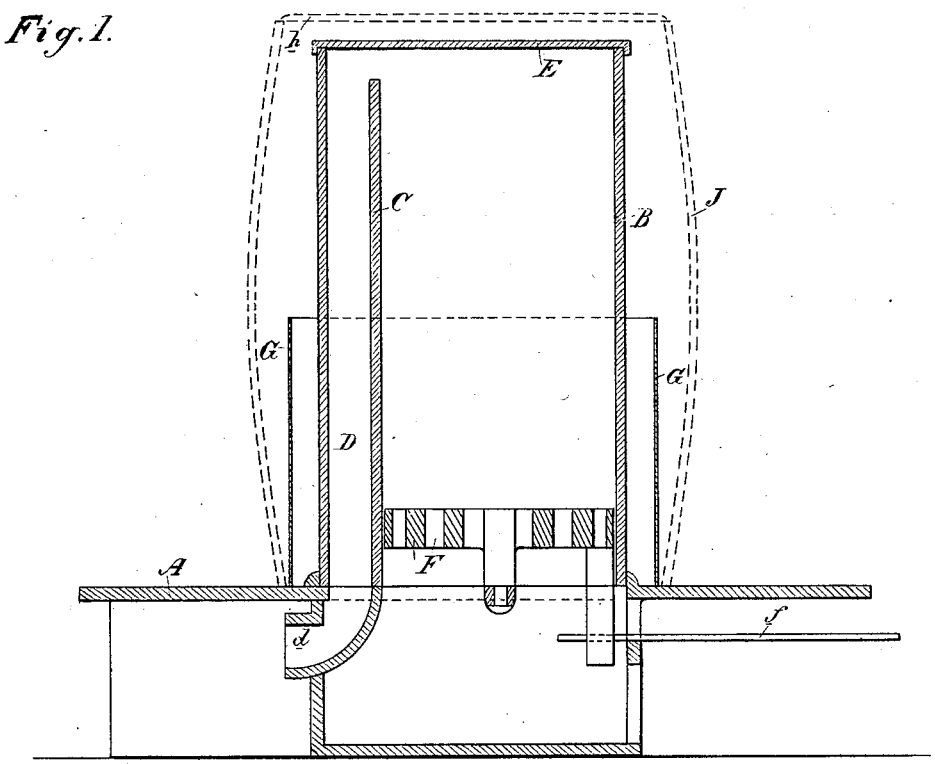
Figure 2:
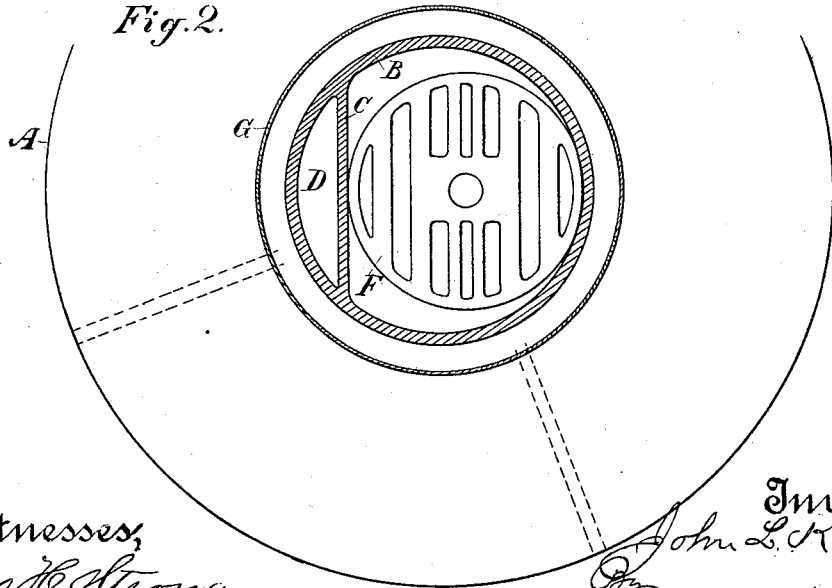

Referring to the accompanying drawings, Figure 1 is a vertical section of my heater. Fig. 2 is a plan of the same.

A is the base upon which the cylinder B is supported. Within the cylinder is a partition or diaphragm, C, in the plane of a chord of said cylinder and forming a smoke-flue, D. On the top of the cylinder is a cover, E. The smoke-flue terminates below the cover and communicates with the interior of the cylinder at its top, and it opens out below, or in the base A, as shown at *d*. Within the lower portion of the cylinder is the grate F, of any suitable pattern, adapted to be shaken by the bar *f*.

G is a sheet-iron case encircling the cylinder. This case does not extend the whole height of the cylinder, but stops short about half-way, (more or less.)

The barrel J is shown in dotted lines. It fits over the heater, completely inclosing the cylinder and the sheet-iron case, the bottom resting on the base A. Its top is provided with a temporary cover, *h*, for keeping the heat in.

The operation of the heater is as follows: The fire is made on the grate, and the products of combustion arising from it pass up to the top of the cylinder and down again through the smoke-flue, and are discharged. The object of the sheet-iron case is to prevent an excess of heat near the bottom of the cylinder. The heat which radiates from near the fire is therefore impeded by the case to such an extent that the barrel will be equally heated at its upper portion as well as its lower portion, notwithstanding its lower portion is nearer the fire.

I am aware that stoves for this purpose are known in which the cylinder is completely enveloped by an outer casting, which forms a smoke-flue between itself and the cylinder; but such a device, in addition to being expensive, is not as effective as my heater, for the reason that the heat is not equally distributed, and is impeded by the heavy metal envelope to such an extent that it requires a much longer time to heat the barrel than it does by the use of my heater. The heater I have herein described is, moreover, simple in construction.

Having thus described my invention, what I claim as new, and desire to secure by Letters Patent, is—

A heater for barrels, comprising the combination of the base A, on which the barrel rests, the cylinder B, supported by the base and having a cover, E, the smoke-flue D, formed by a diaphragm within the cylinder, the grate F within the cylinder, and the encircling case G, extending but part of the height of the cylinder, substantially as herein described.

In witness whereof I have hereunto set my hand.

JOHN L. KOSTER.

Witnesses:
S. H. NOURSE,
H. C. LEE.